Oct. 13, 1959  H. GALLINA  2,908,771
SOUND TRACK FIXTURE
Filed Jan. 8, 1957

INVENTOR
HAROLD GALLINA
BY Campbell, Brumbaugh
Free and Graves
HIS ATTORNEYS

United States Patent Office 2,908,771
Patented Oct. 13, 1959

2,908,771
SOUND TRACK FIXTURE
Harold Gallina, Belleville, N.J.
Application January 8, 1957, Serial No. 633,161
7 Claims. (Cl. 179—100.2)

This invention relates generally to apparatus used to present educational or entertainment programs which include sound as part of the program. More particularly, this invention relates to apparatus of the sort described which is adapted to provide automatic synchronization in such program between the sound medium and another medium, usually visual, by which information is presented.

As an example of the type of program referred to, it is common practice to present, as a travelog or the like, a succession of optically projected slide pictures which are accompanied by a sound commentary discussing the pictures. Suitable equipment for the presentation of the program may consist, for example, of (1) a conventional slide projector wherein a conventional slide changing mechanism responds to successive electrical impulses to position the slides one at a time in projecting position, and (2) a conventional sound reproducer which supplies the sound commentary from a sound track impressed on a magnetic tape passed through the reproducer.

It will be evident that, to provide a satisfactory program, it is necessary to synchronize the projection of the slide pictures with the sound commentary so that any given picture will be projected at the same time that the portion of commentary which relates to this picture is being heard. Such synchronization has, in general, been carried out in the past by the exercise of judgment on the part of the operator of the slide projector. To the end of attaining such synchronization, the said operator listens to the sound commentary and, in accordance with the subject being dealt with by the commentary, actuates the slide changing mechanism to cause projection of a new picture whenever such new picture is called for by the commentary.

The procedure just described, wherein synchronization of the sound medium and the visual medium is accomplished through the intervention of a human operator, has been found to be unsatisfactory in certain respects. Thus, for example, the requirement of the procedure that the operator of the projector listen closely to the sound commentary may divert the operator from other matters to which he should be giving full attention. Also, the operator, even when devoting his best efforts to the task, may not be able to attain precise synchronization with the undesirable result ensuing that the commentary may, at various times, lead or lag the projection of the pictures.

It is accordingly an object of this invention to provide apparatus adapted to permit the projection of slide pictures or the like to be automatically synchronized with a sound commentary which discusses the pictures.

Another object of the invention is to provide apparatus of the sort described wherein the apparatus takes the form of a fixture which may be readily attached to commercially-available magnetic sound reproducers to thereby permit the described automatic synchronization to be obtained without the necessity of utilizing special sound reproducing equipment.

Still another object of the invention is to provide apparatus of the sort described which is adapted for use either with magnetic tape which is transferred from a first reel to a second reel or for use with magnetic tape which is stored on a single reel in such manner that the tape is continuously wound out from one side of the reel and continuously wound in from the other side thereof.

These and other objects are realized according to the invention by providing a support plate adapted to be detachably clamped to a magnetic tape reproducing machine, an electrode holder block mounted in upstanding relation from the plate, and a tape deflecting member also mounted on the plate in upstanding relation therefrom. The holder block has formed therein a tape guideway in the nature of an aperture which extends through the block in a direction parallel to the plane of the plate. The block also has formed therein a tape entrance slit which extends from the top of the block down to the aperture to permit the tape to be slipped into the aperture prior to operation of the reproducing machine.

To one side of the aperture are disposed a pair of spaced-apart electrodes, each of which makes contact with the back side of the tape, i.e., the side of the tape opposite the magnetic coating which carries the sound track. To assure that the back side of the tape will, at all times, make good contact with the electrodes, the tape prior to passing through the aperture of the holding block is led around the tape deflecting member which is suitably disposed on the support plate to warp the tape so as to produce a wrap thereof over the electrodes.

The back side of the tape carries a number of "cue patches" which are in the nature of metallic patches of sufficient extent in the length of the tape to bridge the two electrodes. The "cue patches" are attached by hand to the back of the tape at positions which, in terms of the sound commentary recorded on the front of the tape, mark the end of the discussion of one subject of the commentary and the beginning of the discussion of a new subject. Each "cue patch" when bridging the two electrodes effects a momentary closure of a circuit through the two electrodes to cause a current impulse to flow in this circuit. This current impulse is supplied to the slide projector to actuate the slide changing mechanism thereof to project a new picture. In this manner, the projection of the slide pictures will be automatically synchronized with the sound commentary discussing the pictures.

For a better understanding of the invention, reference is made to the following description and to the accompanying drawings wherein.

Figure 1:
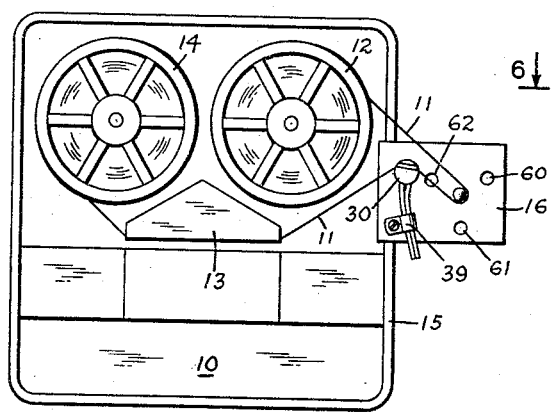
Fig. 1 is a schematic plan view of a magnetic sound reproducer having attached thereto a fixture according to the invention.

Referring now to Fig. 1, a magnetic sound reproducing machine 10 operates from a magnetic tape 11 which is supplied from a reel 12 to pass over a reproducing head 13 and to then be taken up by the reel 14. The machine 10 is characterized by a raised rim 15 on which is detachably clamped the fixture 16 which will soon be described. When the fixture 16 is so clamped to machine 10, the path of tape 11 from supply reel 12 to head 13 is modified to the extent of routing the tape to pass around or through elements of the fixture 16 in a manner to be described.

Figure 2:
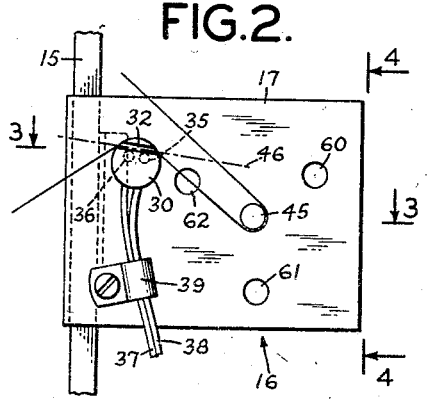
Fig. 2 is a detailed plan view of the fixture of Fig. 1 when attached to the sound reproducer and when having a magnetic tape passing therethrough.
Figure 4:
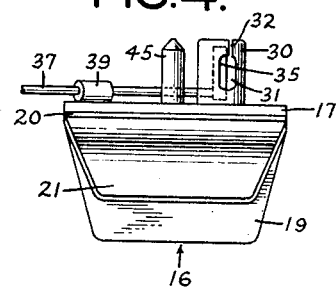
Fig. 4 is a view of the fixture in side elevation taken as indicated by the arrows 4—4 in Fig. 2, the fixture as shown in Fig. 4 being detached from the reproducer of Fig. 1 with no tape being passed through the fixture.
Figure 3:
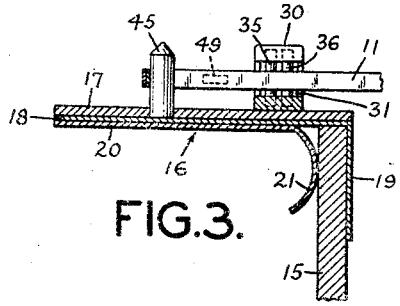
Fig. 3 is a front elevation of a cross-section of the fixture of Fig. 2 taken as indicated by the arrows 3—3 in Fig. 2.

Referring now to Figs. 2, 3 and 4, the fixture 16 includes upper and lower plate members 17, 18 which together form a horizontal support plate. The lower plate member 18 is characterized at one end by a down-turned flange 19. Attached to plate member 18 on the under side thereof is a plate member 17 which terminates at the end thereof towards flange 19 in a resilient tongue 21 which is spaced from flange 19 and which in its upper part curves downwardly toward the flange and in its lower part curves downwardly away from the flange. The flange 19 and the tongue 21 together form a resilient clip by means of which the fixture 16 may be firmly but detachably clamped to the rim 15 of the sound reproducing machine 10 (Figs. 2 and 3).

Attached in a suitable manner to the top of plate member 17 is a cylindrical electrode holder block 30 formed of nylon or some other suitable insulating material. The holder block 30 has formed therein an aperture 31 (Fig. 4) which extends from side to side of the block to provide a guideway through the block for the tape 11. Insertion of the tape into aperture 31 is accomplished by passing the tape through an entrance slit 32 (Fig. 4) formed in the block to extend from the top thereof to the aperture 31.

At one side of the aperture 31 there is received within the block 30 a pair of vertically extending Phosphor bronze electrodes 35, 36 of cylindrical form. The electrodes 35, 36 are spaced apart in the direction of tape travel through aperture 31, and are further disposed in relation to the aperture so that a portion of the cylindrical surface of each electrode projects slightly into the aperture to permit the electrode to make contact with the back side of tape 11. The two electrodes 35, 36 are respectively connected to a pair of lead wires 37, 38 which pass from the electrodes through block 30 and through a clamp 39, attached to plate 17, to ultimately connect with the slide changing mechanism of the slide projector (not shown).

To assure that the back side of tape 11 will be maintained in contact with electrodes 35, 36, it is desirable that the tape be given a wrap around these electrodes. This wrap is imparted to the tape by leading the tape around a tape deflecting member 45 in the form of a post upstanding from the plate member 17 and constituted of a suitable material as, say, nylon. The horizontal location of post 45 relative to the holder block 30 can best be specified by considering (Fig. 2) that the section of tape 11 which is stretched over the electrodes 35, 36 has a horizontal direction which is represented by the dot-dash line 46 extending over the plate member 17. As best shown in Fig. 2, both the electrodes 35, 36 and the post 45 lie to the same side of the line 46. The electrodes 35, 36 are, however, tangent to line 46 while post 45, on the other hand, is offset from line 46. This offset relation of post 45 to line 46 produces a wrap of the tape 11 around electrode 35. A wrap of the tape around electrode 36 is produced by so locating the fixture 16 relative to the sound reproducing head 13 (Fig. 1) that the tape after leaving electrode 36 will be deflected away from line 46 (Fig. 2) in the direction towards electrode 36.

In the construction of fixture 16 as shown in Figs. 1–4, the elements 17—21 are made of sheet steel while, as stated, the elements 30 and 45 are made of a suitable plastic material such as nylon. As an alternative to the form of construction shown in Figs. 1–4, the fixture 16 may be so constructed that the post 45 and the base members 17, 18 are formed as a unitary plastic casting. If the fixture 16 is so constructed, the electrode holder block 30 is formed as a separate plastic body which is attached to the base portion of the unitary plastic casting, and the flange 19 and tongue 21 are replaced by a resilient, stainless steel clip which is attached to the bottom of the base portion of the casting.

Figure 5:
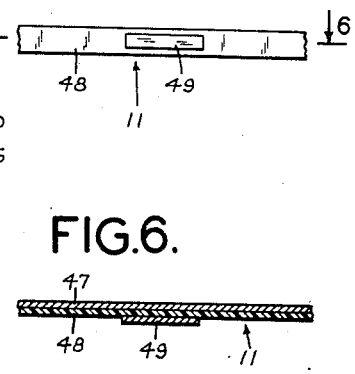
Fig. 5 is a view of the back side of a section of magnetic tape used with the fixtures of Figs. 1–4.
Figure 6:
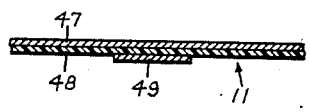
Fig. 6 is a cross-section of the section of tape shown in Fig. 5.

As shown in Figs. 4 and 5 the magnetic tape 11 comprises a magnetic coating 47 adhering to the front side of a plastic strip 48. The sound commentary is, of course, recorded in a sound track impressed on the coating 47. As stated, the sound commentary may consist of a separate discussion of each of a number of successively projected slide pictures. The commentary as heard will thus be characterized by times of transition when the commentary changes from a discussion of one picture to a discussion of the next. Each such transition time corresponds to an identifiable short section of the sound track recorded on coating 47.

For each transition section of the sound track, there is placed on the tape 11 a cue patch 49. Each such cue patch is deposited on the back side of the plastic strip 48 in a location appropriately spaced along the tape from the corresponding transition section so that the cue patch will arrive opposite the electrodes 35, 36 at the same time that the corresponding transition section of the sound commentary arrives under the head 13. In this manner, the contact of any cue patch with the electrodes 35, 36 will indicate that the sound commentary is about to begin the discussion of a new slide picture, and that, accordingly, the slide-changing mechanism of the picture projector should be actuated to cause a new picture to be projected.

The actual indication provided by any cue patch 49 is in the nature of an electrical impulse produced by a temporary bridging by the cue patch of the electrodes 35, 36 to produce momentary closure of a circuit through these electrodes. To the end of effecting this circuit closure, the cue patches should be electroconductive, and should be of great enough extent in the length of the tape to assure that the electrodes 35, 36 will be bridged by each of the patches. Such patches may be provided in a number of ways. For example, the cue patches may be formed either by painting the back of plastic strip 48 with electroconductive paint or by placing on the back of this strip a number of small sections of a commercially available tape which is treated to be adhering on one side and to be electroconductive on the other side.

The fixture 16 is utilized in the following manner to produce automatic synchronization between a sound commentary developed by a sound reproducer of the type shown in Fig. 1 and the pictures projected by a slide projector having a slide-changing mechanism which is actuated by electrical impulses. First, with the reproducer not running, the fixture 16 is attached to the reproducer, and the tape 11 is led from the supply reel 12 around the post 45 and, from thence, is slipped down through the entrance slit 32 of block 30 to feed through aperture 31. Next, the leads 37, 38 are connected in circuit with the slide-changing mechanism of the slide projector (not shown) so that the slide-changing mechanism will be actuated by an electrical impulse each time the electrodes 35, 36 are bridged by a cue patch 49. With these preliminaries being completed, the program may be commenced by setting the sound reproducer and the projector into operation. As the sound commentary from the reproducer moves on from the discussion of one projected picture to the next, the cue patches 49 on the tape 11 will bridge the electrodes 35, 36 at appropriate times to actuate the slide-changing mechanism of the projector to cause successive pictures to be projected in synchronism with the discussion of these pictures by the sound commentary.

Figure 7:
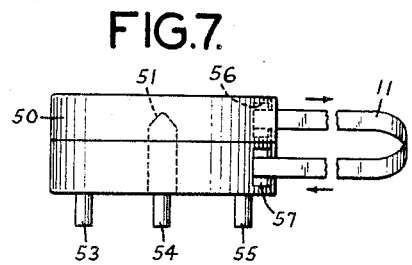
Fig. 7 is a view of a continuous reel of magnetic tape which may be used in conjunction with the fixture of Figs. 1–4.

The foregoing discussion has dealt with the situation wherein the tape 11 is unwound from a first reel at the same time that the tape is being rewound on a second reel. A fixture according to the invention may also be used, however, in the situation where the tape is stored in a single continuous reel in such manner that the tape may be unwound from the reel at the same time that the tape is being rewound on the same reel. Fig. 7 represents one commercially available form of such continuous reel. As shown in the last-named figure, the continuous reel comprises a cylindrical casing 50, a central socket 51, and three downwardly projecting anchoring pins 53, 54, 55 which are symmetrically disposed in the horizontal plane about the socket 51 to form an equilateral triangle wherein the socket 51 is at the center, and wherein the pins 53, 54, 55 are at the vertices of the triangle. In the Fig. 7 reel, the tape 11 projects from the casing 50 in the form of a continuous loop which is fed out of the casing through a slit 56, and which is fed back into the casing through another slit 57.

Where the fixture 16 is to be used with a continuous reel of the form shown in Fig. 7, the post 45 is no longer used as a tape deflecting member, but is, instead, used as a central pin which is received into the socket 51 of the Fig. 7 reel. At the same time that post 45 is received into this socket, the pins 53, 54, 55 of the Fig. 7 reel are received into matching circular holes 60, 61, 62 formed in the plate members 17, 18 and 20 of the fixture 16. With the Fig. 7 reel being so mounted on fixture 16, the portion of tape 11 which is being fed out from slit 56 is threaded through the aperture 31 of holder block 30 to pass over electrodes 35, 36 and to then pass to the reproducing head 13 (Fig. 1). After passing over the last-named head, the tape loops back on itself to be taken up by the Fig. 7 reel through the slit 57.

From the foregoing discussion it will be seen that the invention is capable of being embodied in various forms and is susceptible to numerous applications. For example, the tape deflecting member 45 may take the form of a freely rotatable roll rather than a post. Also, if desired, an additional tape deflecting member may be mounted on said fixture on the opposite side of electrode holder block 30 from tape deflecting member 45, this additional member being properly disposed to produce a wrap around electrode 36. The electrodes 35, 36 may in themselves be rotatable with contact being made by means of brushes between the electrodes 35, 36 and the leads 37, 38. Accordingly, the invention is not to be considered as limited save as is consonant with the scope of the following claims.

I claim:

1. A detachable fixture for a magnetic tape reproducing machine comprising a support plate, means to detachably clamp said plate to said magnetic tape reproducing machine, an electrode holder block mounted by said plate in upstanding relation therefrom and having formed therein a tape guideway in the nature of an aperture extending through said block in a direction parallel to the plane of said plate, said block having also formed therein a tape entrance slit extending normal to said plate from the top of said block to said aperture and extending through said block in said direction, said aperture having normal to both said plane and direction a distended cross section characterized by opposite walls which are respectively displaced outwardly from the opposite margins of said slit and a pair of mutually insulated electrodes mounted in said block at one side of said aperture and spaced from each other in substantially said direction.

2. A fixture as in claim 1 wherein said clamping means is in the form of a resilient clip carried by said support plate.

3. A fixture as in claim 1 wherein said electrodes are in the form of cylindrical members having axes which extend normally to said support plate, said members being received in said holder block at one side of an aperture to have respective portions of the cylindrical surfaces of said member project part way into said aperture.

4. A detachable fixture for a magnetic tape reproducing machine comprising a support plate, means to detachably clamp said plate to said magnetic tape reproducing machine, an electrode holder block mounted by said plate in upstanding relation therefrom and having formed therein a tape guideway in the nature of an aperture extending through said block in a direction parallel to the plane of said plate, said block having also formed therein a tape entrance slit extending normal to said plate from the top of said block to said aperture and extending through said block in said direction, said aperture having normal to both said plane and direction a distended cross section characterized by opposite walls which are respectively displaced outwardly from the opposite margins of said slit, a pair of mutually insulated electrodes mounted in said block at one side of said aperture and spaced from each other in substantially said direction, and tape deflecting means mounted on said plate in upstanding relation therefrom and in offset relation from a line extending through said aperture in said direction and from said aperture over said plate in said direction, said tape deflecting means being offset from said line to the same side thereof as the side on which said electrodes lie in relation to said line.

5. A fixture as in claim 4 wherein said tape deflecting member is in the form of a post.

6. A detachable fixture for a magnetic tape reproducing machine comprising a support plate, a resilient clip carried by said support plate to permit detachable clamping of said fixture to said magnetic tape reproducing machine, an electrode holder block mounted by said plate in upstanding relation therefrom and having formed therein a tape guideway in the nature of an aperture extending through said block in a direction parallel to the plane of said plate, said block having also formed therein a tape entrance slit extending normal to said plate from the top of said block to said aperture and extending through said block in said direction, said aperture having normal to both said plane and direction a distended cross section characterized by opposite walls which are respectively displaced outwardly from the opposite margins of said slit, a pair of mutually insulated cylindrical electrodes mounted in said block at one side of said aperture to be spaced from each other in substantially said direction, said electrodes having their axes normal to said plate and being mounted in said block to have portions of the cylindrical surfaces thereof project part way into said aperture, and a post mounted on said plate in upstanding relation therefrom and in offset relation from a line extending through said aperture in said direction and from said aperture over said plate in said direction, said post being offset from said line to the same side thereof as the side on which said electrodes lie in relation to said line.

7. A detachable fixture for a magnetic tape reproducing machine adapted for use with tape supplied by a continuous reel having a cylindrical casing, a central axial socket in said casing and a plurality of anchoring pins spaced radially from said socket and extending in the axial direction oppositely to the axial extension of said socket, said fixture comprising, a support plate, means to detachably clamp said plate to said magnetic tape reproducing machine, an electrode holder block mounted by said plate in upstanding relation therefrom and having formed therein a tape guideway in the nature of an aperture extending through said block in a direction parallel to the plane of said plate, said block having also formed therein a tape entrance slit extending normal to said plate from the top of said block to said aperture and extending through said block in said direction, said aperture having normal to both said plane and direction a distended cross section characterized by opposite walls which are respectively displaced outwardly from the opposite margins of said slit, a pair of mutually insulated electrodes mounted in said block at one side of said aperture and spaced from each other in substantially said direction, a post mounted on said plate in upstanding relation therefrom and in offset relation from a line extending through said aperture in said direction and from said aperture over said plate in said direction, said tape deflecting member being offset from said line to the same side thereof as the side on which said electrodes lie in relation to said line, said post being adapted to be received into said socket of said reel and said plate having formed therein a plurality of holes adapted to receive said pins of said reel whereby said reel may be mounted on said plate.

References Cited in the file of this patent

UNITED STATES PATENTS

| | | |
|---|---|---|
| 1,950,518 | Reed | Mar. 13, 1934 |
| 1,955,497 | Harvey | Apr. 17, 1934 |
| 2,693,127 | Ortman | Nov. 2, 1954 |